UNITED STATES PATENT OFFICE.

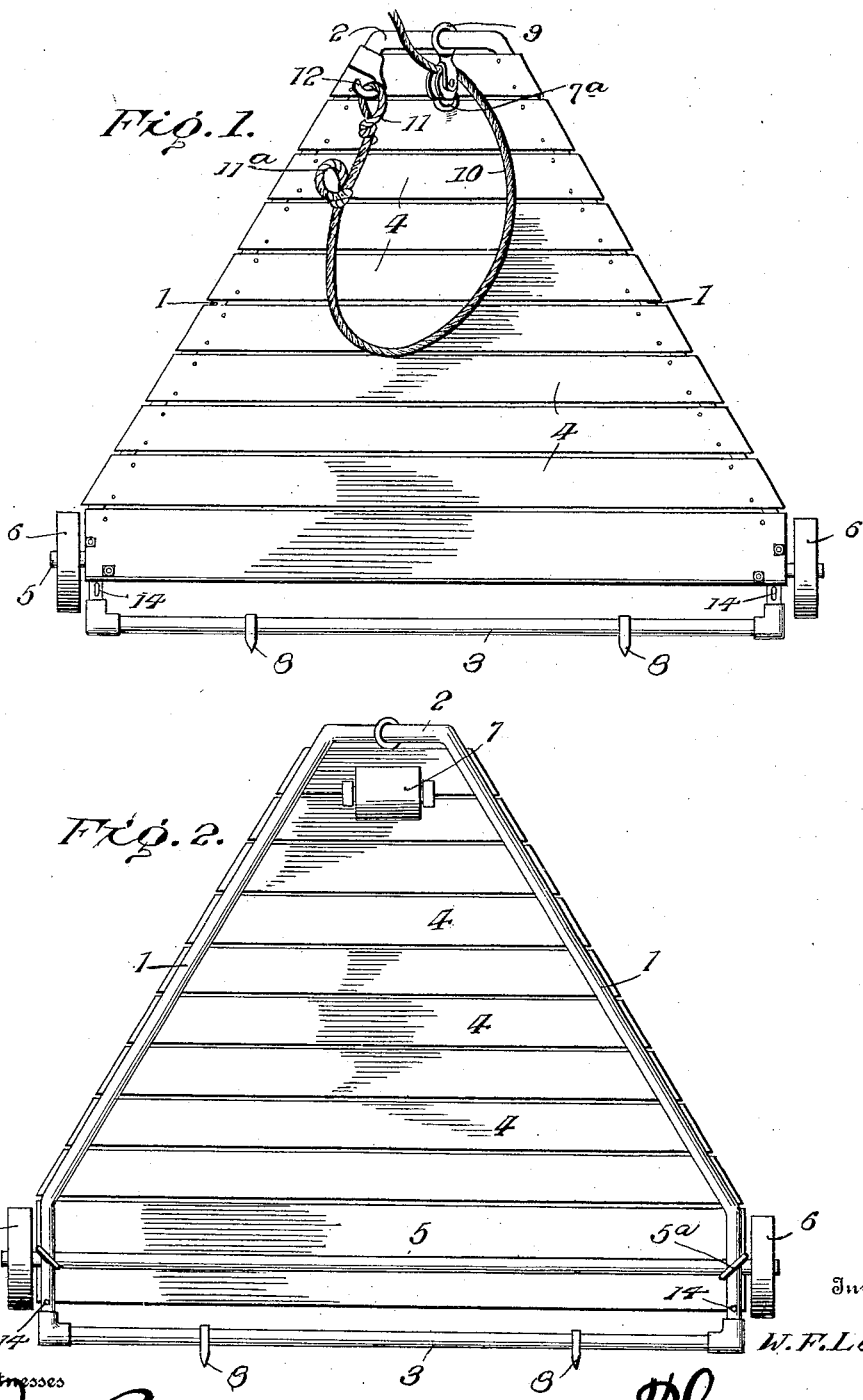

WILLIAM FRANK LOYD, OF GRANVILLE, OHIO.

TRUCK.

No. 865,601.     Specification of Letters Patent.     Patented Sept. 10, 1907.

Application filed May 8, 1907. Serial No. 372,517.

*To all whom it may concern:*

Be it known that I, WILLIAM FRANK LOYD, a citizen of the United States, residing at Granville, in the county of Licking and State of Ohio, have invented certain new and useful Improvements in Trucks, of which the following is a specification.

This invention has for its object a simple, durable and efficient construction of truck designed particularly for hauling corn shocks from the field, and the invention consists in certain constructions and arrangements of the parts that I shall hereinafter fully describe and then point out the novel features in the appended claims.

For a full understanding of the invention and the merits thereof and also to acquire a knowledge of the details of construction and the means for effecting the result, reference is to be had to the following description and accompanying drawings, in which:

Figure 1 is a top plan view of my improved truck. Fig. 2 is a bottom plan view thereof.

Corresponding and like parts are referred to in the following description and indicated in all the views of the drawings by the same reference characters.

The framework of the truck is constructed of solid or tubular rods and embodies side members 1 that extend at their rear ends parallel to each other for a comparatively small portion of their length, and then converge towards the front cross bar 2 to which they are preferably integrally connected.

3 designates the rear cross bar of the framework which may be connected at its ends to the rear ends of the side members 1 by elbow couplings as shown, or other suitable coupling means. The axle 5 is connected by shackle bolts 5ª or the like to the rear ends of the side members 1, and rear traveling wheels 6 are journaled on the ends of said axle. The rear cross bar 3 extends in a plane in the rear of the peripheries of the traveling wheels 6.

7 designates a front traveling wheel, or roller, which may be journaled in any desired manner underneath the truck, preferably to one of the boards 4 of which there are a series as shown, said boards extending transversely over the framework and being secured thereto in any desired manner so as to constitute the flooring or bed of the truck.

A pulley block 9 is swung or pivotally mounted on the front cross bar 2 as shown, and a rope or cable 10 is adapted to extend through said block, said rope being provided at one end with an eye 11 designed for engagement with the forwardly facing hook 12 secured to the truck, preferably to one side bar of the framework near the front end thereof. The rear cross bar 3 is provided with a plurality of rearwardly extending spurs 8.

In the practical operation of my improved truck, when it is used for hauling corn shocks from the field, the truck is tilted on its rear end, being supported against the side of the shock with the spurs 8 preferably embedded in the ground and preventing the truck from slipping. The rope or cable 10 is then passed around the shock and one end of the rope is engaged with the hook 12. The other end of the rope is connected by any suitable form of hitch, (not shown) to the team, and when the horses pull the rope 10, the same will manifestly tighten around the shock and the shock and truck will tip over upon the third wheel or roller 7 and the truck may then be hauled from the field.

From the foregoing description in connection with the accompanying drawings, it will be seen that I have provided a very simple and durable construction of truck by which corn shocks may be easily hauled from the field, avoiding the necessity of elevating or loading the shock on to a vehicle or rack of the ordinary high wheeled construction.

It is to be understood that the front roller 7 is swiveled or in the nature of a caster wheel, so that the device may be properly guided. Preferably the pintle 7ª of the front traveling or caster wheel 7 protrudes above the top of the truck so as to assist in preventing the shock from slipping to either side of the center. If desired, the rope 10 may be provided with one or more knots 11ª near the loop 11 to serve the same purpose of said loop. The framework 1 of the truck may be provided near its rear end with two rearwardly facing hooks 14, said hooks being used as a fastening for a rope to be passed around the bottom of the shock when necessary.

Having thus described the invention, what is claimed as new is:

1. A truck comprising a framework, embodying front and rear cross bars and side bars, an axle secured to said framework, traveling wheels journaled in said axle, the peripheries of said wheels lying in a plane in front of the rear cross bar of the framework, and spurs projecting rearwardly from and mounted on the rear cross bar.

2. A truck, comprising a framework embodying forwardly converging side bars and front and rear cross bars, an axle secured to said framework, traveling wheels journaled in said axle, the peripheries of said wheels lying in a plane in front of the rear cross bar of the framework, a roller at the front of the truck, and a flooring or bed secured to said framework and to one portion of which the front roller is connected.

In testimony whereof I affix my signature in presence of two witnesses.

WILLIAM FRANK LOYD. [L. S.]

Witnesses:
M. M. KING,
C. L. WILLIAMS.